United States Patent [19]

Adachi

[11] 4,168,900
[45] Sep. 25, 1979

[54] COMPACT ERECT OPTICAL IMAGING COPIER SYSTEM AND METHOD

[75] Inventor: Iwao P. Adachi, Westminster, Calif.

[73] Assignee: Minolta Camera Kabushiki Kaisha, Osaka, Japan

[21] Appl. No.: 899,303

[22] Filed: Apr. 24, 1978

[51] Int. Cl.$^2$ .................... G03B 27/00; G03B 27/48; G03B 27/50

[52] U.S. Cl. .......................................... 355/1; 355/50

[58] Field of Search .............. 355/1, 50, 51; 354/292, 354/229

[56] References Cited

U.S. PATENT DOCUMENTS

| | | | |
|---|---|---|---|
| 3,060,805 | 10/1962 | Brumley | 355/1 X |
| 3,398,669 | 8/1968 | Hicks, Jr. | 355/1 |
| 3,409,354 | 11/1968 | Frank | 355/1 |
| 3,447,438 | 6/1969 | Käufer et al. | 354/229 |
| 3,560,084 | 2/1971 | Limberger | 355/50 |
| 3,580,675 | 5/1971 | Hieber et al. | 355/50 |
| 3,592,542 | 7/1971 | Käufer et al. | 355/50 |
| 3,655,284 | 4/1972 | Agliata | 355/50 X |
| 3,694,076 | 9/1972 | Weber | 355/50 |
| 3,836,249 | 9/1974 | Weber | 355/51 |
| 4,129,373 | 12/1978 | Ogura et al. | 355/1 |

*Primary Examiner*—Richard A. Wintercorn
*Attorney, Agent, or Firm*—Jackson, Jones & Price

[57] ABSTRACT

An erect optical imaging system for copying apparatus and method of producing the same is provided. A first pair of array sets of thick object lenses is optically aligned with a second pair of array sets of thick relay lenses to provide a scan line of a plurality of optical paths across an object surface. The refractive powers of the first set of lenses produce a real image in a space between the lens sets and an erect image on an image surface. Each array set comprises two parallel but offset rows of lens elements to provide an overlapping field angle. The use of the thick lenses helps eliminate vignetting problems. Spherical aberration and field curvature is controlled by minimizing the aperture opening of each set of lenses to 4mm$^2$. The lenses can be made by either molding plastic or by individually grinding square glass bars. Demagnification can be achieved with the use of spherical optical path compensators.

25 Claims, 11 Drawing Figures

COMPACT ERECT OPTICAL IMAGING COPIER SYSTEM AND METHOD

BACKGROUND OF THE INVENTION

1. Field of the Invention

The present invention relates to a copying apparatus having an optical scanning imaging system and more particularly to a copying apparatus having a compact erect optical imaging system.

2. Description of the Prior Art

A large number of copying apparatus are known in the prior art and are widely used commercially. Generally, these copying apparatus can vary from a simple wet process copier to complex multiple copy electrostatic copiers. The competitive pressure of a number of entrants into the copying field has increased the efforts to provide more economical machines that ate compact while at the same time maintaining the necessary requirements of image clarity. The optical systems that have been suggested and utilized in the copier field have ranged from conjugate lens systems for reproducing the entire document at one time to lenticular bars used in scanning a relatively moving original object.

One of the known problems in the copier field is the requirement of a relatively long track length between the original object and the copy. The long track length is necessary in order to provide an adequate field of view angle for the imaging objective lens system. Efforts to reduce the track length by increasing the number of lens elements correspondingly increases the cost of the lens system.

In efforts to provide a compact scanning copier apparatus, various suggestions have existed in the patent literature such as the two lenticular screens of U.S. Pat. No. 3,447,438; the pairs of lenslets suggested in U.S. Pat. No. 3,694,076; the overlapping lens strips suggested in U.S. Pat. No. 3,655,284 and the fiber optical imaging system suggested in U.S. Pat. Nos. 3,398,669 and 3,560,084.

Other strip scanning copying apparatus are suggested in U.S. Pat. Nos. 3,580,675, U.S. Pat. No. 3,836,249 and U.S. Pat. No. 3,592,542.

Attempts have been made to provide relatively inexpensive constructions of lens strip imaging devices by duplicating individual lens elements and molding them from plastic or assembling them in an array. Problems of providing the reproduction clarity required while removing vignetting, spherical aberration and field curvature problems and further maintaining a relatively economic imaging lens system has plagued these design efforts to date.

Accordingly, there is a need in the copier field to provide a compact erect optical imaging system that can be manufactured for a relatively low cost while providing minimal distortion and aberrations in the projected image.

SUMMARY OF THE INVENTION

The present invention provides an erect optical imaging system for copying apparatus of a compact and economical size. An appropriate transparent support member such as a glass plate is provided for supporting an original object to be copied and defining an object plane. Positioned adjacent the object surface is a first pair of array sets of object lenses having respective thicknesses along their optical axis that are greater than the radius of curvature of their refractive ends. Each array set of object lenses extends parallel to each other across the width of an object desired to be copied and are further offset to provide overlapping field of view with the other array set. The offsetting arrangement increases the field of view and improves the resolution of off-axial points. A second pair of array sets of relay lenses complete the objective strip lens assembly. The lenses forming this second array set again have a thickness greater than the radius of curvature of their refractive surfaces. An advantage of these thick lenses is to help eliminate vignetting problems in the optical system. The relay lenses are also positioned to provide corresponding overlapping field of view and are respectively juxtaposed relative to the first pair of array sets of object lenses to form a plurality of optical paths for collectively transmitting a combined image of an original object that extends beyond any single field angle of any one optical path. An appropriate image surface is provided within the image plane of this objective lens system. A reduced inverted real image is formed directly in the space between the object lens elements and the relay lens elements and an erect image is formed on the image surface.

Spherical aberration and field curvature are controlled within acceptable tolerances by providing individual aperture openings for each lens array having a maximum effective area approximately no greater than 4 $mm^2$. Preferably, each lens element is identical in the strip copying apparatus.

A modified embodiment of the present invention provides a demagnification between the object and the image surface. This is accomplished by again providing two sets of lenses that are optically aligned. A central axis or a midpoint of the scan strip is positioned traverse to both the object and image planes. The respective lens sets on either side of this central optical axis are inclined at progressively greater degrees of angle as the scan strip continues in length. A pair of aspherical optical path compensators are provided on either side of the sets of lenses in the optical axis to adjust for the variances in the optical path resulting from the position of the lens elements from the central optical axis thereby insuring proper perspective to the reduced image.

A method of making the compact erect optical imaging system comprises selecting an appropriate glass sheet such as $BaK_4$ having an index of refraction of approximately 1.5688 and a thickness of approximately 2 mm. Square bars of an appropriate length are then cut and polished from this glass sheet and the respective ends of the square glass bars are ground and polished to provide refractive surfaces. The glass bars are then coated to optically isolate the interior of each glass bar thereby preventing any optical cross talk when they are mounted and aligned together to form an array of lenses on an optical flat. A pair of array lenses are then mounted parallel to each other but having offset optical axes to provide overlapping field angles to that the optical center of one lens array is positioned on the edges of adjacent parallel lens elements. These pair of arrays can then be mounted together at a predetermined distance to complete the objective lens system in the copier apparatus.

Alternatively, the optical imaging system can be made from optically refractive plastic that has been positioned in a plurality of rasters of parallel non-refractive surfaces. A lenticular strip of refractive lens elements can then be injection molded and attached to each end of the grating optical member to complete one set of lenses. These lenses can then be aligned and mounted to a second grating optical member to provide the overlapping field angles as mentioned above.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

The following description is provided to enable any person skilled in the copier field to make and use the invention and sets forth the best modes contemplated by the inventor of carrying out his invention. Various modifications, however, will remain readily apparent to those skilled in the art since the generic principles of the present invention have been defined herein specifically to provide a copier having an erect optical imaging system that is both compact and economical and that can be manufactured by relatively simple and economical methods.

Figure 1:
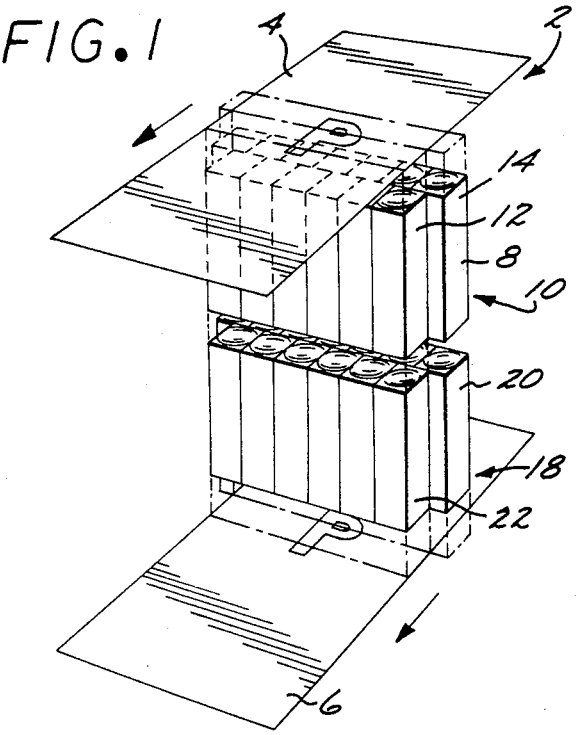
FIG. 1 is the schematic perspective view of a compact erect optical imaging system for copying apparatus.

Referring to FIG. 1, a compact erect optical imaging system 2 is mounted in a copying apparatus having a transparent object support surface 4 serving as a means for supporting an original object to be copied and defining an object plane. The copying apparatus further provides an image surface 6 that can be of a conventional light responsive member capable of creating a usable pattern thereon as is well-known in the copier art.

Mounted between the object surface 4 and the image surface 6 is an erect optical objective system that is relatively inexpensive to manufacture while providing an increased field of depth with acceptable levels of spherical aberration, chromatic aberration and field curvature and a minimum vignetting of the light rays.

This particular optical imaging system is of a strip configuration and the actual number of lens elements that comprise the strip configuration are, of course, variable relative to the design criterion of the particular copier apparatus. Since, however, the number of lenses bears directly on the cost of the copier apparatus there is an economic limit to the number of elements to be used. FIG. 1 is simply a schematic view illustrating the principles of the present invention and the individual lens elements 8 disclosed are not drawn to a scaled size or number. It should be realized that the lens element sizes are only approximately 2 mm square and from 10 to 20 mm in length. The number of individual lens elements that are arranged in a linear scan direction will be approximately 125 elements to duplicate the capability of conventional compact copier apparatus that can reproduce from a 200×250 mm document.

A first pair of array sets of objective lenses 10 include a first row 12 of parallel aligned lens elements and a second row 14 of parallel aligned lens elements. As will be described subsequently, each of the individual optical lens elements 8 forming the parallel rows are optically isolated from each of the other lens elements. The first row 12 is offset from the second row 14 such that the individual optical axis of each lens element in each parallel row are positioned to be aligned with the respective edges of a pair of individual lens elements in the other row. p Because the individual lens elements are stopped down to provide a small aperture of approximately 4 mm² maximum, a pair of rows 12 and 14 are necessary to permit high resolution of off-axis points. While not shown in FIG. 1, for purposes of clarity of illustration of the pair or array sets, shim rasters 16 are positioned in the image space between the first pair of array sets 10 and a second pair of array sets 18. These shim rasters 16 can be formed from a polyester sheet of a non-refractive surface having a thickness of 0.005 inches. The purpose of these shim rasters 16 are to prevent optical cross talk between adjacent lens elements.

The second pair of array sets 18 comprise a first parallel row 20 that is again offset from a second parallel row 22. This second pair of array sets can be considered relay lenses to transmit and invert the real image formed between the juxtapositioned lens elements of the first pair of array sets 10 and the second pair of array sets 18. The collective effect of these pairs of array sets is to transmit a combined image of an original object that is positioned to extend beyond the limited field angle of any one optical path formed by a pair of lens elements in their respective first and second array sets.

Figure 2:
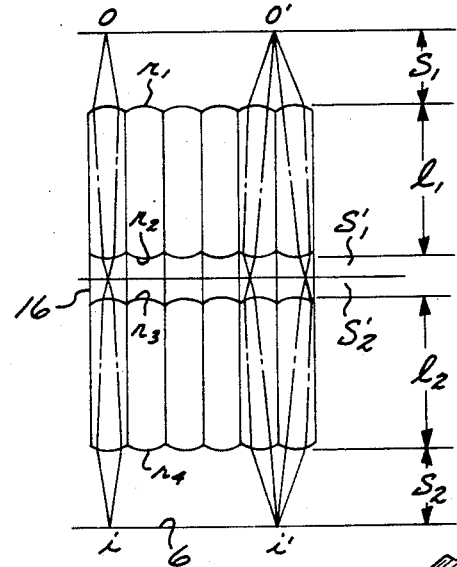
FIG. 2 is a cross-sectional schematic view of the lens system of FIG. 1 disclosing various ray traces.

Referring to FIG. 2, a schematic lens diagram is disclosed showing a ray trace of an object, o, on an optical axis of the focal plane 4 to form an erect image, i, on the image surface 6. FIG. 2 also discloses an off-axis object point, o', that falls into the overlapping field angle of two adjacent lens elements and produces a combined off-axis image, i'.

In FIG. 2, $s_1$ is the distance from the object to the vertex of the curvature of the surface of the lens elements on the optical axis; $l_1$ is the distance from the object side vertex to the image side vertex of the object lens element; $s_1'$ is the distance from the vertex of the curvature on the image side of the object lens to the inverted real image; $s_2'$ is the distance from the real inverted image to the vertex of the curvature of the object side of the relay lens; $l_2$ is the distance from the object side vertex to the image side vertex of the relay lens element and $s_2$ is the distance from the vertex of the image side of the relay lens to the erect image. The various radius of curvatures are designated r, with appropriate sub-numbers. As can be appreciated, the thickness or length of the lens elements along their optical axes are much greater than their individual radius of curvature.

A purpose of the design of FIGS. 1 and 2 is to provide a significant advantage over a conventional lens system having a thin lens construction which would require a field lens to be positioned at the inverted real image. By providing these thick lenses an optical trace from the off-axis is prevented from extending beyond the second relay lens and thereby causing serious vignetting problems. Thus, an appropriate field angle is maintained without suffering from serious vignetting problems. By realizing the inverted image in the image space between the object and relay lenses both imperfections on the surface of the lenses and any dust particles can be removed from being realized on the image plane.

A preferred intermediate image magnification of 0.67 is realized in the image space between the object and relay lens. This demagnification facilitates the spacing of the rasters 16 to eliminate any optical cross talk.

Because the thick lens elements that are utilized in the present invention have a length considerably larger than their radius of curvature on their power surfaces, these lenses will experience considerable aberrations such as chromatic, spherical, field curvature, etc. To provide a commercially viable lens system it is necessary to maintain at least a 0.5 contrast at eight lines per millimeter with a resolution capability of 15 lines per millimeter. Both the object and relay lenses are positive and this further increases the chromatic aberration in the lens system.

To achieve the necessary contrast and performance, the lens system will be stopped down to a converging angle corresponding to about F/10. As a further design choice, based on the expected resolution of image that will be acceptable, the diameter of circle of least confusion is chosen as larger than f/300 where f is the focal length of a lens. As mentioned earlier the diameter or maximum aperture of the lens will be 2 mm.

The focal depth can be calculated as follows;

$$z \times (f/300) \times (f/2a) = (2a300)(f/2a)^2 \qquad (1)$$

The value 2a is the diameter of the lens. For a lens having a F/10 cone angle at the conjugate distance and setting f equal to approximately 20 mm, the diameter of the circle of least confusion will be;

$$(f/300) = (20/300) = 0.0675 \text{ mm} \qquad (2)$$

The focal depth (Z) will be;

$$(Z) = (20/300) \times (20/2) = 0.675 \text{ mm} \qquad (3)$$

From the above figures, assumptions can be made to improve the performance of the lens system. For example, if we locate the image side surface of the object lens at a distance greater than 0.675 mm, we can insure that the surface will not deteriorate the image quality if it becomes covered with dust or if there is even a poor surface quality from manufacturing. Because the second positive surface is going to be located relatively close to the intersection of the principle ray with the optical axis, it should not change the overall geometry and the relative dimensions that have been assumed in the calculations. Additionally, the change in the refractive index of the transmission medium as the light rays leave the glass or plastic lens and enter the air will bend those rays toward the optical axis and in effect function as a field lens, thereby improving the relative illumination of the lens system by minimizing the vignetting of the light rays.

In computing the radius of curvature of the image size surface of the object lens, we can image the first surface vertex, that is the point on the object side surface that intersects with the optical axis, at an infinite distance. Since we are striving to achieve an erect image with a 1:1 magnification, we can calculate a rough figure for this radius of curvature with some basic assumptions as to the thickness of the lens along the optical axis and the index of refraction. These rough assumptions can be tabulated as a variable of the refractive index of the medium used for the lens elements as follows:

TABLE I

| N | $r_1$ | $r_2$ | $s_2$ | B |
|---|---|---|---|---|
| 1.5 | 3.6 | 5.7 | 1.64 | 0.0021 |
| 1.6 | 4.15 | 6.3 | 1.75 | 0.0018 |
| 1.7 | 4.67 | 7.0 | 1.89 | 0.0017 |
| 1.8 | 5.14 | 7.6 | 2.01 | 0.0016 |
| 1.9 | 5.59 | 9.0 | 2.21 | 0.0014 | wherein N equals the refractive index;
$r_1$ is the image side radius of curvature,
$r_2$ is the object side radius of curvature,
$s_2$ is the image space between the object lens and relay lens along the optical axis, and
B is the spherical aberration coefficient.

As can be seen from the above Table I, by increasing the refractive index, the radius of curvature of $r_1$ and $r_2$ will become longer and the spherical aberration coefficient B will become smaller and a better image can be obtained.

The finalized optical design can be accomplished by ray tracing with the assistance of a computer. In the following example, a BaK$_4$ glass having a refractive index N=1.5688 and an Abbe Number $\nu$=56.1 was selected. The choice of this particular glass was for the purposes of selecting a relatively inexpensive glass that still has a relatively high index of refraction. Glasses with a higher refractive index with low dispersion would be a further advantage in providing better optics but the material cost could well be prohibitive. It should be realized that the present invention is not limited to this particular index of refraction. The resulting lens design parameters are set forth in the following Table II.

TABLE II

| Radius of Curvature | Axial Distance | Refractive Index/ Abbe Number |
|---|---|---|
| | $s_1$ = 18.000 | Air |
| $r_1$ = +4.203 | | |
| | $l_1$ = 17.000 | 1.569/56.1 |
| $r_2$ = −4.376 | | |
| | $s_1'$ = 1.344 | Air stop |
| | $s_2'$ = 1.344 | Air |
| $r_3$ = +4.376 | | |
| | $l_2$ = 17.000 | 1.569/56.1 |
| $r_4$ = −4.203 | | |
| | $s_2$ = 18.000 | Air |

Accordingly, the total track length between the object and the image is 72.689 mm.

The optical transfer function for this lens was calculated based on a best focus of $\lambda = 546$ nanometers and an optical contrast of eight lines per millimeter.

TABLE III

| Wave Length | 546 | 486 | 656 | (nm) |
|---|---|---|---|---|
| On axis | 0.53 | 0.53 | 0.05 | |
| Off Axis Height 1mm | | | | |
| for tangential | 0.53 | 0.41 | 0.23 | |
| for sagittal | 0.53 | 0.45 | 0.16 | |

For an off-axis incident height of 1 mm. vignetting will be approximately 80 percent in this lens design. As can be readily appreciated, the chromatic aberration is considerable because only positive lens elements are utilized in the lens design, and additionally spherical aberration will be relatively significant. The spherical aberration and field curvature can be minimized by stopping down the aperture of the individual lens elements to 2 mm.

In reviewing the design parameters of Table II above, and noting the closeness of the second surface $r_2$ to the intermittent image, a further design option can be made to realize economies in the manufacturing of the lens system. In this regard the second surface is close enough to the intermittent image that, if its radius of curvature is made equal to the first surface $r_1$, there would be no significant deterioration of the image within the acceptable parameters of the copier apparatus. Accordingly, the inventive design is further finalized as follows to provide an optimum compact erect optical imaging system that can be economically manufactured.

TABLE IV

| Radius of Curvature | Axial Distance | Index of Refraction |
|---|---|---|
| $r_1 = 4.2$ | $s_1 = 20$ | |
| | $l_1 = 14$ | $N_1 = 1.569$ |
| $r_2 = -4.2$ | | |
| | $s_1' = 1.90$ | |
| | $s_2' = 1.90$ | |
| $r_3 = 4.2$ | | |
| | $l_2 = 14$ | $N_2 = 1.569$ |
| $r_4 = -4.2$ | | |
| | $s_2 = 20$ | |

The total track length of Table IV will be 71.8 mm to thereby provide a relatively compact configuration while still adequately correcting for the various aberrations that are inherent in this optical system. The choice of a maximum aperture opening of no greater than 4 mm$^2$ minimizes the problems of spherical aberration and field curvature. To improve any image degradation resulting from stopping down the lens to this particular field of angle, a second parallel row of lens elements are offset so that their optical axes are aligned with the edges of the two adjacent lenses in the first parallel row. Thus, the off-axis images will be reinforced to maintain the desired 0.5 contrast for white light at eight lines per millimeter.

For comparison sake, normal copying apparatus lenses are used that require a distance of 600 mm between the object and image when a 200×250 mm sheet of paper is being copied at a magnification of 1:1. Usually the total field of these lens are assumed to be 40 degrees. With the present invention, a compact erect optical imaging system permits the duplication of the normal size copier with a distance of only 72 mm. The resultant image on the image surface is erect and has a magnification of 1:1.

Since the individual optical array will require many lens elements parallel to each other to cover the desired scan width, a large number of the individual lens elements will have to be precisely mounted together. For example, to cover 250 mm with 2 mm aperture lens elements, 125 lens elements will be required for the object lens array and additionally another 125 elements will be required for the relay lens array. Since each array set is paired to provide an overlapping field of view with the other array set, twice as many elements will require, that is 500 lens elements will be required to form the total erect optical imaging system. Additionally, the optical axis of the perspectively matched object and relay lenses will have to be precisely aligned.

The present invention contemplates two possible methods of producing the pair of array sets for use in the optical imaging system.

Figure 4:
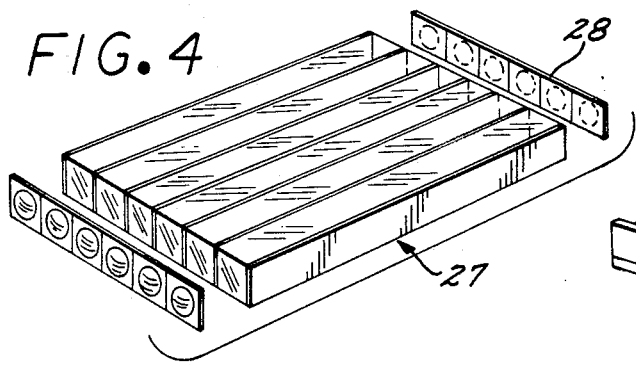
FIG. 4 is a schematic view of a second step in a method of making a plastic lens array.
Figure 3:
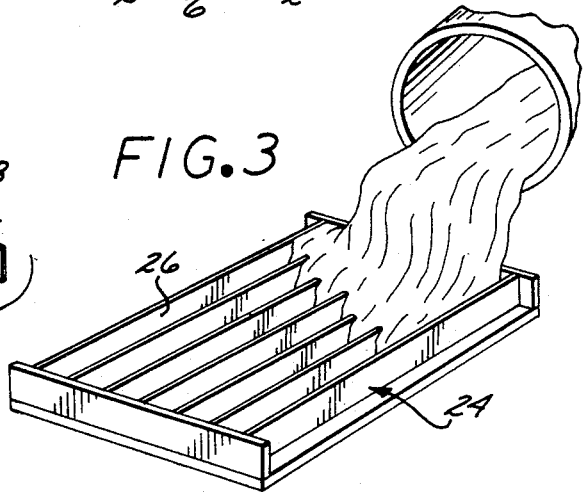
FIG. 3 is a schematic view of one step in a method of making a plastic lens array.
Figure 5:
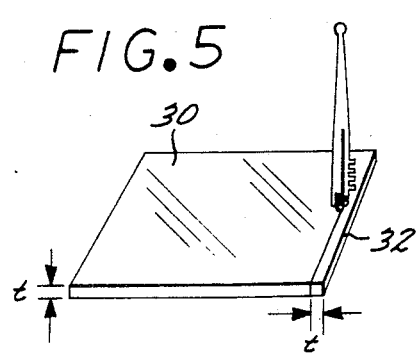
FIG. 5 discloses a schematic view of a first step in an alternative method of making a glass lens array.

Referring to FIG. 3, a grating frame 24 having nonrefractive surfaces comprises a plurality of individual raster shims 26. A clear plastic epoxy such as No. 342/1 sold by the Able Stik Co. of Gardena, California with an index of refraction of 1.54 or a copolymer of styrene and acryl with an index of 1.57 can be poured between the shims 26 of blackened or oxidized copper and subsequently heated until it is cured to form a block 27 of parallel optical conduits preferably of at least 125 elements per block. The curing temperature is 165° F. to 200° F. a time period of 2 to 4 hours. Subsequently, as can be seen in FIG. 4, a plastic lenticular bar 28 that is formed by standard injection molding techniques, for example, of a copolymer of styrene and acryl having an index of refraction of 1.57 that can be purchased under the trademark TYRILL from DOW Chemical Co. can be attached to the conduit block 27. A pair of these lenticular bars 28 are matched and appropriately fastened to each end of the conduit block 27 to form one array set. The lenticular bar 28 has appropriate refractive powers that can extend across a portion as shown in FIG. 4, or the entire segment of the lenticular bar that matches and overlaps the end of each optical conduit.

Figure 7:
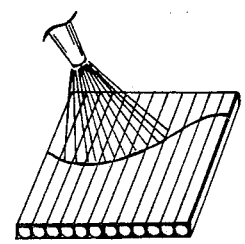
FIG. 7 discloses a schematic view of a third step in making a glass lens array.
Figure 8:
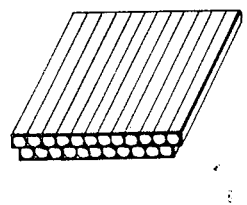
FIG. 8 discloses a schematic view of a complete pair of glass array sets.

Thus, a relatively economical method of forming an array of square translucent optical members is provided. As can be seen in FIG. 7, the upper and lower surfaces can be appropriately coated with a non-refractive coating to insure an optical isolation of each individual translucent conduit member. Finally, as can be seen in FIG. 8, a pair of optical element arrays can be fixedly aligned and attached together to form one-half of the erect optical imaging system.

An alternative method of forming the individual optical arrays would be as follows. A glass plate 30 having a thickness of 2 mm will have both of its surfaces polished and buffed. Individual square glass bars 32 are then cut to provide roughly a square of 2 mm per side. The cut surface can be ground by a number 1,000–1500 said with an angle established at 90 degrees. As can be appreciated, cylindrical rods could be optically utilized instead of the square glass bars, however their cost would be considerably more in production and in addition the space between the parallel rows of cylindrical lens would occupy about one quarter of the total volume of the lens array. Non-uniform shrinkage of the cement during curing could then distort the optical alignment that is necessary to achieve the purposes of the present invention. The choice of square lenses facilitates the optical alignment with conventional tools.

Figure 6:
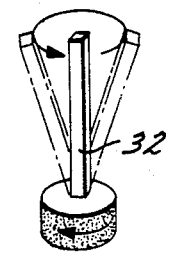
FIG. 6 discloses a schematic view of a second step of making a glass lens array.

An appropriate jig can support the individual square glass bars and each of the ends can be ground and polished to the desired surface as shown in FIG. 6. Each of the sides and top and bottom of the lens elements can be painted black to a thickness of one to two μm. Alternatively, a shim impregnated with epoxy glue could be used on each side. The polished surface of each of the individual square lens elements are then optically contacted to an optical flat and subsequently cured together with cement. The array of lens elements can then be framed to hold it tightly together and its optical contact with the optical flat can then be released.

Figure 9:
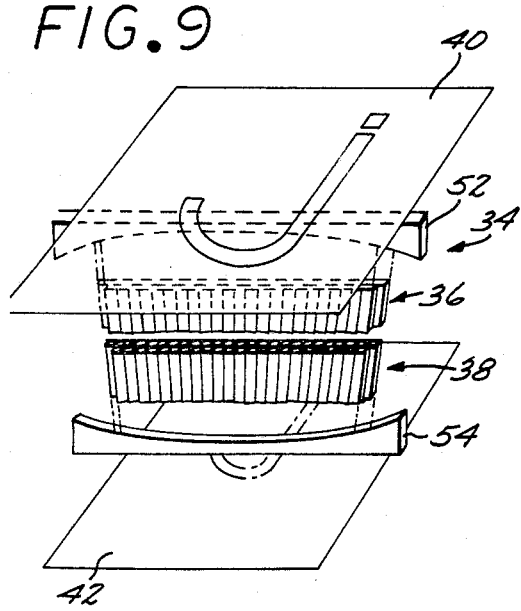
FIG. 9 discloses a perspective schematic view of a demagnification optical imaging system of the present invention.

A further modification of the erect optical imaging system of the present invention is disclosed in a perspective schematic view in FIG. 9. This demagnification optical system 34 again comprises a first pair of array sets 36 and a second pair of array sets 38. Again each array set is a plurality of parallel rows of cross-sectional square lenses that are optically isolated from each other. The thickness or length of the individual lens elements in the first pair of array sets 36 are shorter however than the individual lengths of the lens element in the second pair of array sets 38. The object plane 40 and the image plane 42 are the same as described above.

Figure 10:
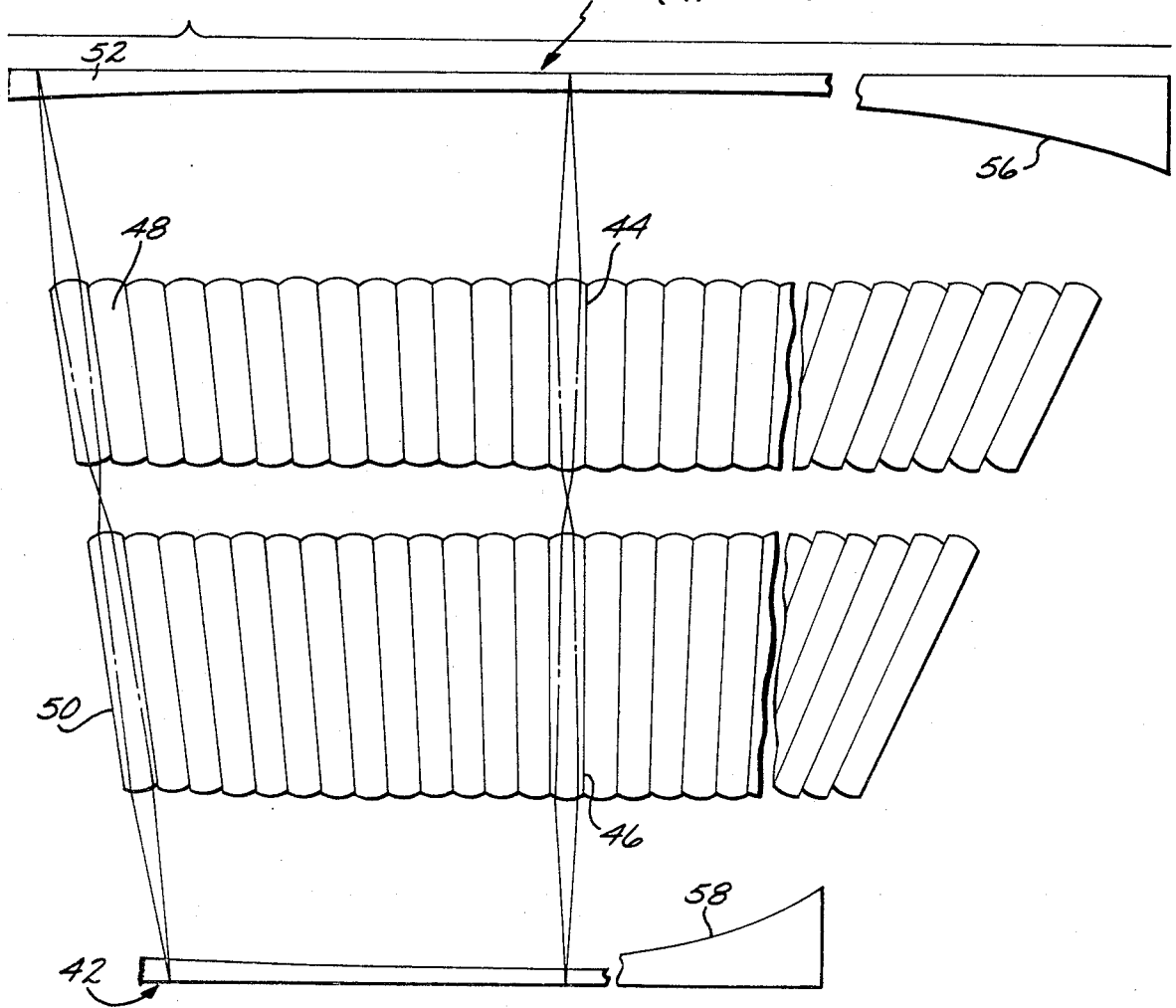
FIG. 10 discloses a partial schematic cross-sectional optical diagram of the demagnification lens system, and FIG. 11 discloses a chart of object distance versus magnification for the demagnification system disclosed in FIG. 9.

Referring to FIG. 10, a partial cross-sectional schematic view of the optical system 34 is disclosed. It should be realized that the actual array sets will contain 125 lens elements per each parallel row. As can be seen from FIG. 10 only a portion of the imaging system is reproduced. Additionally for purposes of illustration the necessary shims between the lens array in the intermediate image space are not shown.

An object lens element 44 is positioned in the midpoint of the scan array such that its optical axis is traverse to the object plane 40 and the image plane 42. A relay lens element 46 is optically aligned with the object lens element 44. The resulting ray trace of a point on the optical axis of this pair of lens elements is appropriately disclosed. As the lens elements, m, extend outward from this central or midpoint, the tilt or inclination of their optical axis to the optical axis of the midpoint lenses will increase. This is illustrated as shown in FIG. 10 by selecting an object lens element 48 and its matched relay lens element 50 in disclosing the inclined ray trace of its principle rays from the object plane 40 to the image plane 42. The range of angle inclination will go from approximately zero at the midpoint to approximately 40 degrees at the outermost edge, as can be seen from Table VI below.

Figure 11:
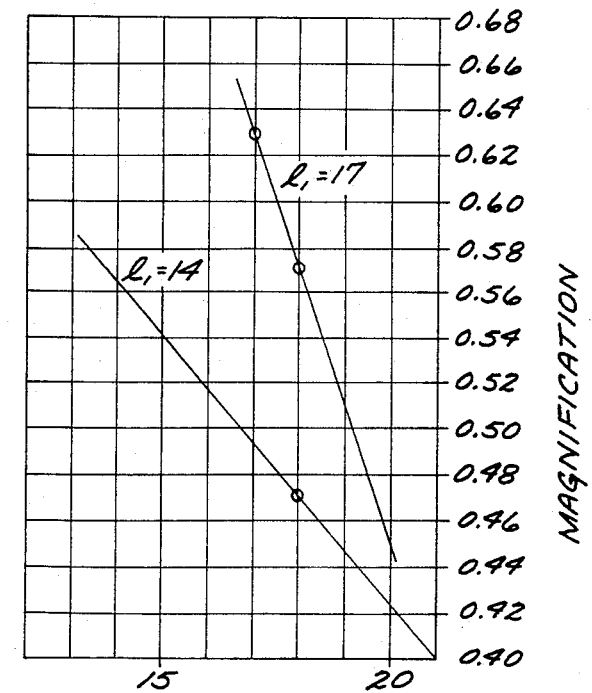

Referring to FIG. 11, a graph of the relationship between the change of object distance, $s_1$, for various lens thicknesses versus the magnification is plotted for a lens element having a thickness $l_1 = 14$ and a thickness $l_1 = 17$ mm. The derivation of this relationship was for a lens element made from a BaK$_4$ glass with a symmetrical radius of curvature, $r = 4.2$ mm.

Thus, when the object distance, $s_1$, is changed, the back focus distance, $s_1'$, will also vary. The ratio of these changes is 1:0.5 and the magnification is 0.04. These variations are linear as long as a single lens element is changed one variable at a time. Again the increase in the lens thickness, $l_1$, also effects the magnification change.

As can be appreciated the individual lens elements will have a truncated configuration to eliminate any spaces between the individual lens elements along the parallel row of the array. Since these lens elements are formed in a truncated configuration they can be identical lens elements thus minimizing the cost in manufacturing and assembly. As can be appreciated the ability to grind and polish the flat sides to an accuracy which insures precise alignment is well within the state of the art.

The specific demagnification required can be subjectively determined by changing the object distance, $s_1$, per the graph shown in FIG. 11. For example, to accomplish a 50 percent reduction with a 72 mm track length the following design can be utilized.

TABLE V

| Radius of Curvature | Axial Distance | Index of Refraction |
|---|---|---|
| | $s_1 = 19$ | |
| $r_1 = 4.2$ | | |
| | $l_1 = 14$ | $N_1 = 1.569$ |
| $r_2 = -4.2$ | | |
| | $s_1' = 2.2$ | |
| | $s_2' = 1.63$ | |
| $r_3 = 4.2$ | | |
| | $l_2 = 17.2$ | $N_2 = 1.569$ |
| $r_4 = -4.2$ | | |
| | $s_2 = 17.2$ | |

The optical design in the above Table V provides the desired demagnification for the exact center of the field with a track length of 71.2 mm. It should be realized, however, that as you progressively move along the scan array away from the midpoint toward the edge of the field, the optical distance between the object and the intermittent image and also between the intermittent image and the final erect image increases proportionally to the off axis angle $\theta$. Since it is the intention to provide a proportionate constant magnification over the entire field while still having the advantage of maintaining the same lens design parameters for each of the individual lens elements in the array, as set forth in Table V, it is therefore necessary to locate a higher index media in each of the optical paths so that the same optical path relationship will be held for the entire field. This can be accomplished by a number of different arrangements such as with the use of compensating prisms or a Fresnel lens system. A preferred method is providing aspherical optical path compensators 52 and 54 as shown respectively in FIGS. 9 and 10.

For example, if we assume that a is the optical path through an optical compensator of a higher index medium; b is the path through air, n is the index of refraction, m is the lens element offset from the midpoint of the scan array and $\theta$ is the off-field angle, we can then determine the following relationships in equation (4) through (6) to define the necessary thickness of the optical path compensators as a function of $\theta$. We also arbitrarily determine at the center or midpoint of the field that 1 mm of path through the higher index of material of an optical path compensator will be equivalent to a zero thickness. This assumption is simply to permit a molding or grinding of an aspherical envelope across the entire linear field.

$$a + b = \frac{s_1}{\cos\theta} \tag{4}$$

$$\frac{a}{n} + b = s_1 - (1 - \frac{1}{n}) \tag{5}$$

$$a = s_1 \frac{(\frac{1}{\cos\theta} - 1) + (1 - \frac{1}{n})}{1 - \frac{1}{n}} \tag{6}$$

The resulting plot, not drawn to scale, can be seen on FIG. 10 as the respective aspherical surfaces 56 and 58 the actual values can be seen from the following Table VI. The aspherical surfaces should be molded or cut within a thickness accuracy of ±0.01 mm.

TABLE VI

| m | θ | a(mm) |
|---|---|---|
| 0 | 0 | 1.00 |
| 10 | 6.1° | 1.56 |
| 20 | 12.05° | 3.24 |
| 30 | 17.78° | 5.97 |
| 40 | 23.14° | 8.69 |
| 50 | 28.1° | 13.28 |
| 60 | 32.65° | 19.63 |
| 70 | 36.75° | 25.64 |

Accordingly, a predetermined demagnification can be added as a feature to a compact copying apparatus. Since illumination should be specifically provided taking into consideration the compact line scanning mode of operation, reference is made to U.S. Pat. No. 3,947,106 issued Mar. 30, 1976 and the same is incorporated herein by reference to supplement the present disclosure.

While the preferred embodiments of the present invention are disclosed herein it should be realized that alternative modifications are possible by a person skilled in the field and accordingly the scope of the present invention should be measured solely from the following claims.

What is claimed is:

1. An erect optical imaging system for copying apparatus forming optical paths for transmitting images from an object to an image surface comprising;
    means for supporting an original object to be copied;
    a first pair of array sets of object lenses having respective thicknesses along their optical axes greater than the radius of curvature of their surface on the object side, each array set offset from the other to provide an overlapping field of view with the other array set, and
    a second pair of array sets of relay lenses having at least the same thickness as the first pair and respectively juxtaposed relative to the first pair of array sets of object lenses to form a plurality of optical paths for collectively transmitting a combined image of an original object positioned to extend beyond the field angle of any one optical path, and
    means for providing an image surface, the refractive power of the object lenses producing a real image directly in the space between the object lens and the relay lens, and the refractive power of the relay lenses producing an erect image on the image surface.

2. The invention of claim 1 wherein the entrance and exit refractive powers of the object and relay lenses are approximately the same.

3. The invention of claim 1 further including means for minimizing spherical aberration and field curvature including an aperture opening on each conjugate lens having a maximum effective area approximately no greater than 4 mm$^2$.

4. The invention of claim 1 wherein each object lens and relay lens is formed from a square glass bar.

5. The invention of claim 1 wherein each array of object lens and relay lens includes a plurality of a central bar member optically isolated from each other and a lenticulate bar attached to each end to provide a refractive power.

6. The invention of claim 1 further including a pair of elongated aspherical lenses for providing optical path compensation and means for mounting the first and second array sets relative to and between the aspherical lenses to provide a demagnification of the object on the image surface.

7. The invention of claim 1 wherein each lens is made from BaK$_4$ glass.

8. The invention of claim 1 wherein each lens is made from a plastic having an index of refraction of approximately 1.57.

9. The invention of claim 2 wherein the thickness of each lens is approximately 14 mm, the radius of curvature is approximately 4.2 mm and the index of refraction is approximately 1.57.

10. The invention of claim 2 wherein the respective object and relay lenses are conjugate and the intermittent real image between the object and relay lenses is smaller than the object.

11. The invention of claim 6 wherein the thickness of lenses of the second pair of array sets is greater than the first pair of array sets.

12. A compact erect optical imaging system for copying apparatus forming optical paths for transmitting images from an object to an image surface comprising:
    means for supporting an original object to be copied;
    a first plurality of object lenses having a thickness along their optical axes greater than the radius of curvature of their object surface, and
    a second plurality of relay lenses juxtaposed relative to the first plurality of object lenses to form array lens sets for transmitting a combined image from an object positioned to extend beyond the field angle of any one set of lenses, the refractive power of the object lenses producing a real image in the space between the object lens and the relay lens;
    means for minimizing spherical aberration and field curvature including an aperture opening for each lens array having a maximum effective area approximately no greater than 4 mm$^2$, and
    means for providing an image surface.

13. The invention of claim 12 wherein each object lens and relay lens is formed from a glass bar.

14. The invention of claim 12 wherein each array of object lens and relay lens includes a plurality of a central bar member optically isolated from each other and a lenticulate bar attached to each end to provide a refractive power.

15. The invention of claim 12 further including a pair of elongated aspherical lenses for providing optical path compensation and means for mounting the first and second array sets relative to and between the aspherical lenses to provide a demagnification of the object on the image surface.

16. The invention of claim 12 wherein the thickness of each lens is approximately 14 mm, the radius of curvature is approximately 4.2 mm and the index of refraction is approximately 1.57.

17. The invention of claim 12 wherein the respective object and relay lenses are conjugate and the intermittent real image between the object and relay lenses is smaller than the object.

18. The invention of claim 15 wherein the thickness of lenses of the second pair of array sets is greater than the first pair of array sets.

19. A compact erect optical imaging system for providing a demagnification in a copying apparatus between an object and an image surface comprising;
   means for supporting an original object to be copied;
   a first optical path compensation, adjacent the means for supporting, having edge thicknesses greater than its central thickness along the optical axes,
   a first set of lenses aligned about a central axis and having respective optical axes that are inclined at a greater angle as their distance increases from a central optical axis;
   a second set of lenses aligned about the central optical axis and respectively matched with the same inclinations as the first set of lenses;
   a second optical path compensator also having edge thicknesses greater than its central thicknesses, and
   means for providing an image surface adjacent the second optical path whereby the image of an object is demagnified as it is transmitted through the imaging system.

20. The invention of claim 19 wherein each optical path compensator has an elongated aspherical surface.

21. The invention of claim 19 wherein each set of lenses includes two rows of lenses that are offset to provide an overlapping field angle.

22. The invention of claim 19 wherein each lens element has a cross sectional square configuration with an axial truncated shape.

23. The invention of claim 19 wherein the radius of curvature of each lens element are the same.

24. The invention of claim 23 wherein each lens element is at least three times thicker than its radius of curvature.

25. The invention of claim 24 further including means for minimizing spherical aberration and field curvature including an aperture opening for each lens having a maximum effective area of approximately no greater than 4 mm$^2$.

* * * * *

Notice of Adverse Decision in Interference

In Interference No. 100,762, involving Patent No. 4,168,900, I. P. Adachi, COMPACT ERECT OPTICAL IMAGING COPIER SYSTEM AND METHOD, final judgment adverse to the patentee was rendered Mar. 17, 1983, as to claims 1–4, 8, 10, 12, 13 and 17.

[*Official Gazette June 14, 1983.*]